METHOD FOR SEPARATING SUBSTRATES

Filed May 16, 1967

INVENTORS
Warren Rice
Kenneth Wayne McAlister
BY John E. Vandigriff
ATTORNEY 3,562,057

METHOD FOR SEPARATING SUBSTRATES

Kenneth Wayne McAlister, Tempe, and Warren Rice, Scottsdale, Ariz., assignors to Texas Instruments Incorporated, Dallas, Tex., a corporation of Delaware Filed May 16, 1967, Ser. No. 638,903
Int. Cl. B01j *17/00;* H01l *5/00;* H01r *39/00*
U.S. Cl. 156—300 10 Claims

ABSTRACT OF THE DISCLOSURE

Disclosed is a method for breaking a substrate into segments along scribed lines while maintaining the original orientation of the segments and for separating the segments so that each segment may be individually removed without disturbing any other segment by encapsulating the substrate prior to the breaking thereof and then stretching the encapsulating package to separate the segments.

This invention relates to a method of separating the segments of a substrate of material which has been broken into discrete regions and is particularly applicable to the semiconductor art for separating the segments of a semiconductor wafer which has been scribed and broken while maintaining the orientation of the individual segments.

In the manufacture of semiconductor devices it is the usual practice to form many devices or circuits upon a single wafer of semiconductor material. After the devices have been formed, it is necessary to separate each device one from the other by cutting the wafer up into segments on which one or more devices or circuits have been formed. The separation of the individual devices may be by scribing orthogonal lines on the wafer and then breaking the wafer along the lines to form the individual segments. If care is not taken in the breaking of the wafer, individual segments will be broken, therefore, destroying what would have been useful devices.

The breaking of the wafer generally has been limited to drawing a hand roller across the semiconductor wafer which is retained by two sheets of wet silk paper or some similar material. In breaking the wafer in this manner, the yield of usable devices has not been satisfactory and the wafer segments are not retained in positions relative to each other the same as they were before the wafer was broken.

In attempts to preserve the original positioning of the individual segments, the wafer has been bonded to a backing material with an adhesive; however, in the breaking process the adhesive may bleed through the breaks onto the surfaces of some of the devices. Also, it is then not easy to remove the small segment from the surface because of the adhesive material. The adhesive material must be dissolved with a solvent so that the segment may be removed, and then the device must be cleaned to remove the adhesive therefrom, which process is time consuming and not very satisfactory.

It is therefore one object of this invention to provide a method of high yield breaking of a scribed wafer.

It is another object of the invention to preserve the original positioning of the individual wafer segments during the breaking process.

It is still another object of the invention to provide a method of mounting and separating segments of a semiconductor wafer so that each individual segment may be easily removed therefrom.

One feature of the invention is a method of separation of the segments of a broken wafer which maintains the original positioning of the individual segments and then permits easy removal of each segment from a mounting surface.

Other objects and features of the invention will be apparent from the following detailed description taken in conjunction with the appended claims and attached drawing in which:

Figures 1, 2, 3, 4:
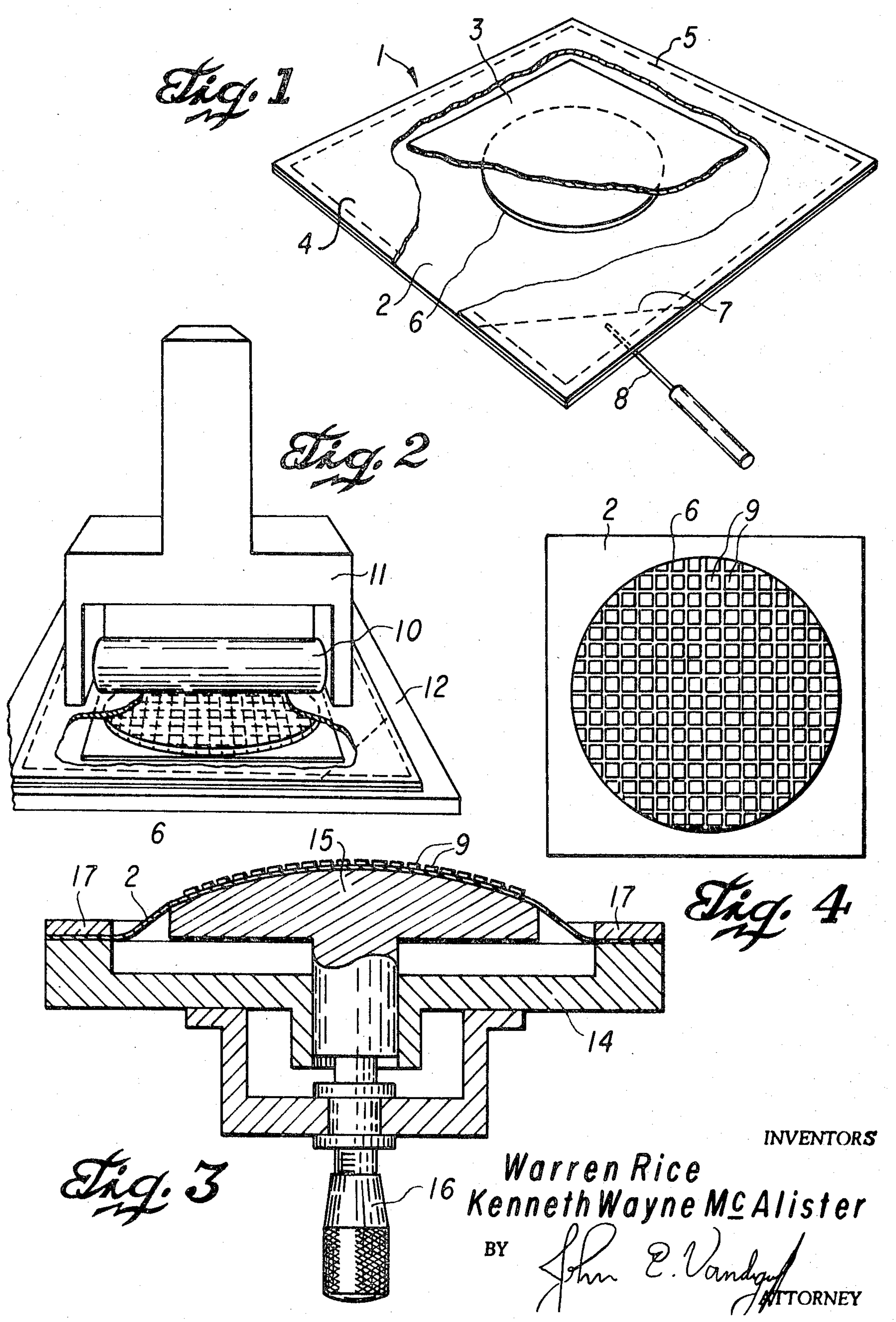
FIG. 1 shows an encapsulated semiconductor wafer in which the wafer may be broken and the separation of the segments be maintained.
FIG. 2 shows an encapsulated wafer under a roller used to break the semiconductor wafer.
FIG. 3 shows a sectionel view of an apparatus used in segment separation after the wafer has been broken.
FIG. 4 shows a wafer after it has been broken and after the individual segments have been separated from each other and maintained in proper orientation.

In FIG. 1 a wafer upon which a large number of semiconductor devices has been formed therein and then scribed is placed between two soft pliable sheets of a heat sensitive, impervious material. The wafer 6 is placed upon sheet 2 with the device side up and then covered by a metal foil 3. Sheet 4 is placed over sheet 2, the foil and the wafer. A circumferential heat seal is made around the periphery of the sheets 2 and 4 as shown at 5. This completely seals the semiconductor wafer between the two sheets.

After the sealing operation is accomplished, a vacuum needle 8 is inserted in between the sheets 2 and 4 and a vacuum is then drawn causing the two sheets of material to be drawn in against the wafer, sealing it therein. The vacuum needle 8 is then partially withdrawn and a seal 7 is placed across a corner of the package to maintain the vacuum therein.

Any pliable material may be used that will adhere to itself under pressure and/or heat and in particular it has been found that a material such as polyethylene may be used since this material adheres to itself upon the application of heat.

The encapsulated wafer is now ready to be broken into the individual segments. A breaking apparatus similar to that shown in FIG. 2 may be used. The apparatus comprises a roller 10 mounted in a frame 11, the roller moving over a surface 7 which is pliable, for example, rubber. The encapsulated wafer is placed in position in front of the roller and oriented such that the scribed surface faces the breaking pad 7 and the scribed lines are orthogonal. Experience has shown that a higher yield results when the scribed lines are set parallel to the axis of the roller. The appropriate roller size and pressure may vary in accordance with the wafer thickness and scribe dimensions, examples of which are hereafter given. As the roller passes over the wafer, the encapsulated material and breaking pad are locally deformed to permit breaking deflection of the water. It is the simultaneous combination of breaking freedom and preserved orientation which result in the high breaking yield. After the initial roller pass is passed, the wafer is rotated 90° and a final pass is made. An important feature of this invention is that the encapsulated wafer may be removed from the breaking apparatus and slightly flexed to visually examine the resulting segments; should any scribe remain unbroken, the breaking process procedure may be repeated since segment is still in its original position. The breaking process does not affect the vacuum within the encapsulation and the segments may be stored until needed.

Specific experiments were conducted using germanium and silicon semiconductor wafers over the dimensionally common intersecting scribe range of 15 to 200 mil squares. The roller sizes ranged in diameter from .155 inch to .75 inch which were pressed downward with a breaking force range from 15 to 8 pounds. The breaking pad was .0625 inch thick rubber.

After the wafer has been broken and all the segments are broken away from each other, they may be physically separated and their relative positioning remain the same.

The separating apparatus shown in FIG. 3 is designed to stretch the encapsulation and thereby separate the individual segments. Separation is necessary since other facial interference during segment removal would disrupt the surrounding segments. Due to the heat sensitive property of the encapsulating material, a heat source may be applied to aid in the separation process. After separation is completed, the encapsulating layer above the segments may be removed as shown in FIG. 3. Since the segment positioning is preserved, a probe is easily implemented to index over the wafer and remove the segments individually.

The specific separating apparatus as shown in FIG. 3 has a dome piston 15 which may serve not only at a heat source but may be used to stretch the polyethylene. The encapsulation is securely clamped in the frame 14 by ring 17 on all sides and the dome 15 driven upward against the lower side 2 of the encapsulation. The purpose of the metal foil is to prevent the upper layer 4 from adhering to the segments. The heat applied to the encapsulation causes the bottom surface of the segments to adhere to the lower layer 2 of the encapsulating material. The adhesive force is strong enough to hold the segments in place and maintain their orientation; however, they may be easily removed by tweezers or a vacuum probe. The separation obtained is more than sufficient to allow either the tweezers or the vacuum probe to be used to pick up one segment without disturbing the surrounding segments. The separation may be varied by the amount that piston 15 is moved upward, for example, a vernier dial 6 may be turned to move the piston 15 up the required amount to provide the desired separation between the segments.

In FIG. 4 a typical wafer is shown after separation in which the wafer 6 is still mounted on the lower sheet of encapsulating material 2 with the individual segments 9 separated one from the other.

Although the present invention has been shown and illustrated in terms of a specific preferred embodiment, it will be apparent that changes and modifications are possible without departing from the spirit and scope of the invention as defined in the appended claims.

What is claimed is:

1. A method for separating a plurality of segments of a substrate which has been scribed to identify the individual segments, comprising the steps of encapsulating said substrate between two sheets of heat sensitive material, breaking said substrate along said scribe lines and stretching said sheets to separate said segments of said substrate while maintaining the original relative position of each segment.

2. The method according to claim 1 wherein a sheet of metal foil is placed between said wafer and one of said pliable sheets to prevent the adherence of the wafer thereto.

3. The method according to claim 1 wherein a peripheral seal is made between said pliable sheets to enclose said substrate and a vacuum is created therein.

4. The method according to claim 1 wherein said pliable sheets are stretched by clamping the periphery of the sheets within a frame and moving a surface up against the bottom of said sheets to apply stretching force thereto.

5. The method according to claim 1 wherein the step of breaking includes the steps of placing the encapsulated substrate on a pliable surface and moving a roller thereover, the axis of said roller being parallel to the scribe lines on said substrate and rotating said encapsulated substrate 90° and moving the roller over the substrate for a second time.

6. The method according to claim 4 wherein said surface pressed against said pliable material is heated during the stretching step.

7. A method for separating a semiconductor wafer along scribe lines into a plurality of segments and separating said segments while maintaining the positioning of each segment relative to the other segments, comprising the steps of sealing said substrate between two sheets of heat sealable material, breaking said substrate into segments, and stretching said material to separate said segments.

8. The method according to claim 7 wherein a piece of metal foil is placed between said substrate and one of said two sheets of heat sealable material.

9. A method according to claim 7 wherein after sealing said substrate between two sheets of heat sealable material a vacuum is created between the materials to cause them to be drawn inward against said substrate.

10. The method according to claim 7 including the step of heating said heat sealable material while it is being stretched.

References Cited

UNITED STATES PATENTS

| | | | |
|---|---|---|---|
| 1,936,980 | 11/1933 | Hooton ___________ | 156—300X |
| 3,448,510 | 6/1969 | Bippus et al. __________ | 29—413 |

ROBERT F. STAHL, Primary Examiner

U.S. Cl. X.R.

29—413, 423, 583; 53—21; 225—93